(12) United States Patent
Ofelt et al.

(10) Patent No.: US 9,356,880 B1
(45) Date of Patent: May 31, 2016

(54) MULTI-LINK ROUTING

(71) Applicant: Juniper Networks, Inc., Sunnyvale, CA (US)

(72) Inventors: David J. Ofelt, Los Gatos, CA (US); Stephen W. Turner, Menlo Park, CA (US); Dennis C. Ferguson, Palo Alto, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 297 days.

(21) Appl. No.: 13/937,006

(22) Filed: Jul. 8, 2013

Related U.S. Application Data

(62) Division of application No. 11/937,219, filed on Nov. 8, 2007, now Pat. No. 8,483,222, which is a division of application No. 09/885,223, filed on Jun. 20, 2001, now Pat. No. 7,315,900.

(51) Int. Cl.
*H04L 12/863* (2013.01)
*H04L 12/865* (2013.01)

(52) U.S. Cl.
CPC .......... *H04L 47/624* (2013.01); *H04L 47/6215* (2013.01); *H04L 47/6275* (2013.01)

(58) Field of Classification Search
None
See application file for complete search history.

(56) References Cited

U.S. PATENT DOCUMENTS

| | | | |
|---|---|---|---|
| 5,615,211 A | 3/1997 | Santore et al. | |
| 5,703,881 A | 12/1997 | Kay et al. | |
| 5,991,817 A | 11/1999 | Rowett et al. | |
| 6,072,797 A | 6/2000 | Fletcher | |
| 6,118,768 A | 9/2000 | Bhatia et al. | |
| 6,147,997 A * | 11/2000 | Holden et al. | 370/395.1 |
| 6,157,649 A | 12/2000 | Peirce et al. | |
| 6,160,808 A | 12/2000 | Maurya | |
| 6,167,445 A | 12/2000 | Gai et al. | |
| 6,188,699 B1 | 2/2001 | Lang et al. | |
| 6,198,749 B1 | 3/2001 | Hui et al. | |
| 6,212,165 B1 | 4/2001 | Mann et al. | |
| 6,222,837 B1 | 4/2001 | Ahuja et al. | |
| 6,278,709 B1 | 8/2001 | Walker et al. | |
| 6,345,302 B1 | 2/2002 | Bennett et al. | |
| 6,389,035 B1 | 5/2002 | Bertagna et al. | |
| 6,393,487 B2 | 5/2002 | Boucher et al. | |
| 6,490,296 B2 | 12/2002 | Shenoi et al. | |
| 6,529,959 B1 | 3/2003 | Armistead et al. | |
| 6,563,821 B1 | 5/2003 | Hong et al. | |
| 6,577,644 B1 | 6/2003 | Chuah et al. | |

(Continued)

OTHER PUBLICATIONS

Frame Relay Forum Technical Committee, "End-to-End Multilink Frame Relay Implementation Agreement," FRF.15, Aug. 1999, 11 pgs.

(Continued)

*Primary Examiner* — Christopher Crutchfield
(74) *Attorney, Agent, or Firm* — Shumaker & Sieffert, P.A.

(57) ABSTRACT

The invention is directed to techniques for supporting multi-link protocols within a computer network. In one embodiment, a method includes receiving a set of data blocks from a plurality of links in one or more interface cards according to a multi-link protocol and sending the data blocks to a multi-link service card for sequencing. The data blocks may then be sent to the one or more interface cards for communication to a destination device over a computer network. Implementing a multi-link service card may allow a network device, such as a router, to support multi-link protocols.

16 Claims, 13 Drawing Sheets

(56) References Cited

U.S. PATENT DOCUMENTS

| | | |
|---|---|---|
| 6,594,234 B1 * | 7/2003 | Chard et al. .................. 370/236 |
| 6,594,268 B1 | 7/2003 | Aukia et al. |
| 6,718,139 B1 | 4/2004 | Finan et al. |
| 6,735,173 B1 | 5/2004 | Lenoski et al. |
| 6,747,964 B1 | 6/2004 | Bender |
| 6,757,894 B2 | 6/2004 | Eylon et al. |
| 6,760,338 B1 | 7/2004 | Merchant et al. |
| 6,778,495 B1 | 8/2004 | Blair |
| 6,788,686 B1 | 9/2004 | Khotimsky et al. |
| 6,789,118 B1 | 9/2004 | Rao |
| 6,795,435 B1 | 9/2004 | Jouppi et al. |
| 6,822,960 B1 | 11/2004 | Manchester et al. |
| 6,839,322 B1 | 1/2005 | Ashwood |
| 6,865,687 B1 | 3/2005 | Ichimi |
| 6,876,669 B2 | 4/2005 | Shalom |
| 6,977,892 B2 | 12/2005 | Kalkunte et al. |
| 6,990,121 B1 | 1/2006 | Stiles et al. |
| 7,031,320 B2 | 4/2006 | Choe |
| 7,065,038 B1 * | 6/2006 | Brandt et al. .................. 370/219 |
| 7,102,999 B1 | 9/2006 | Sindhu et al. |
| 2002/0136223 A1 | 9/2002 | Ho |
| 2002/0165978 A1 | 11/2002 | Chui |
| 2003/0118029 A1 * | 6/2003 | Maher et al. ............. 370/395.21 |

OTHER PUBLICATIONS

Frame Relay Forum Technical Committee, "Multilink Frame Relay UNI/NNI Implementation Agreement," FRF.16, Aug. 1999, 46 pgs.

K. Sklower et al., "The PPP Multilink Protocol (MP)," RFC 1990, Aug. 1996, 22 pgs.

* cited by examiner

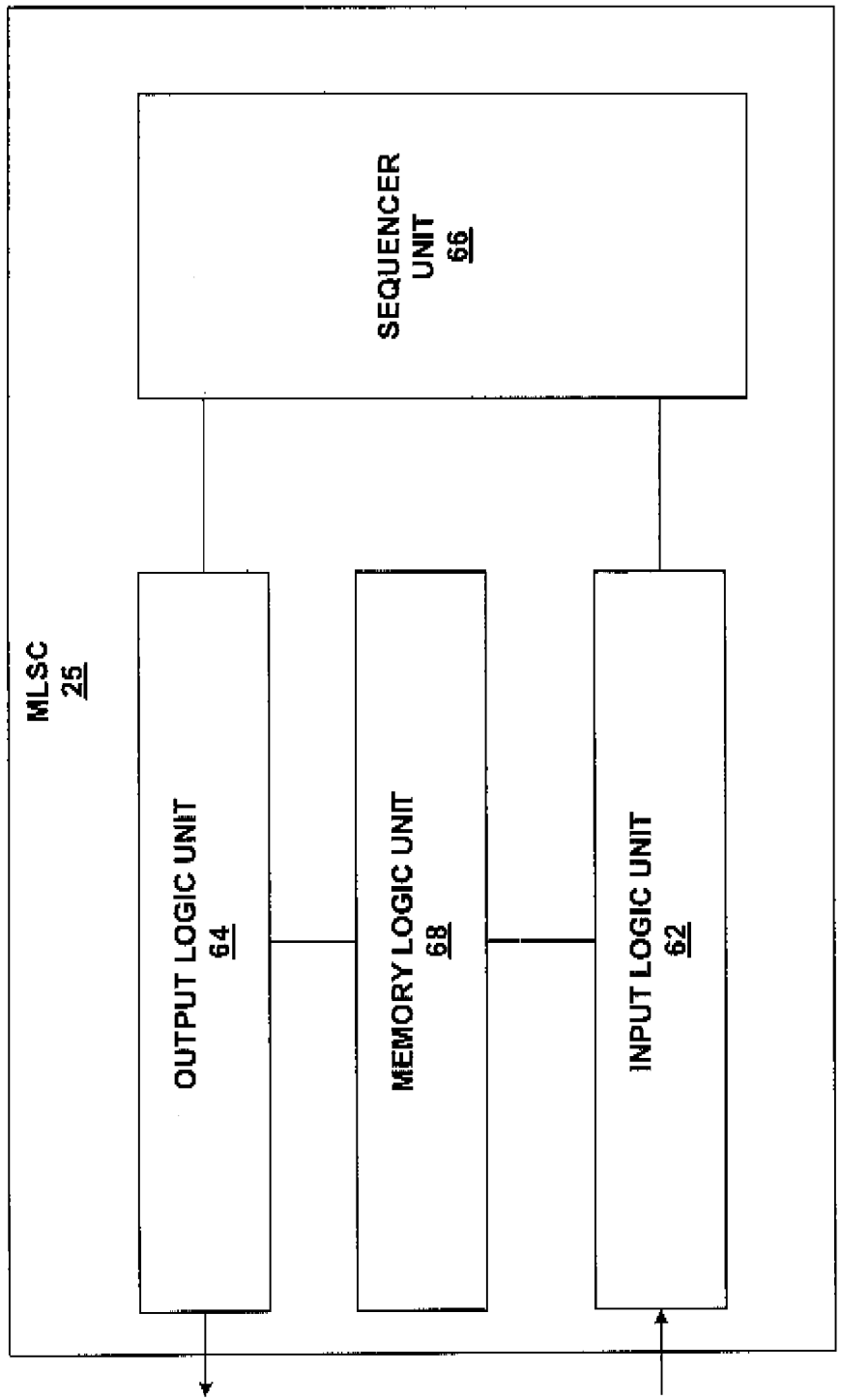

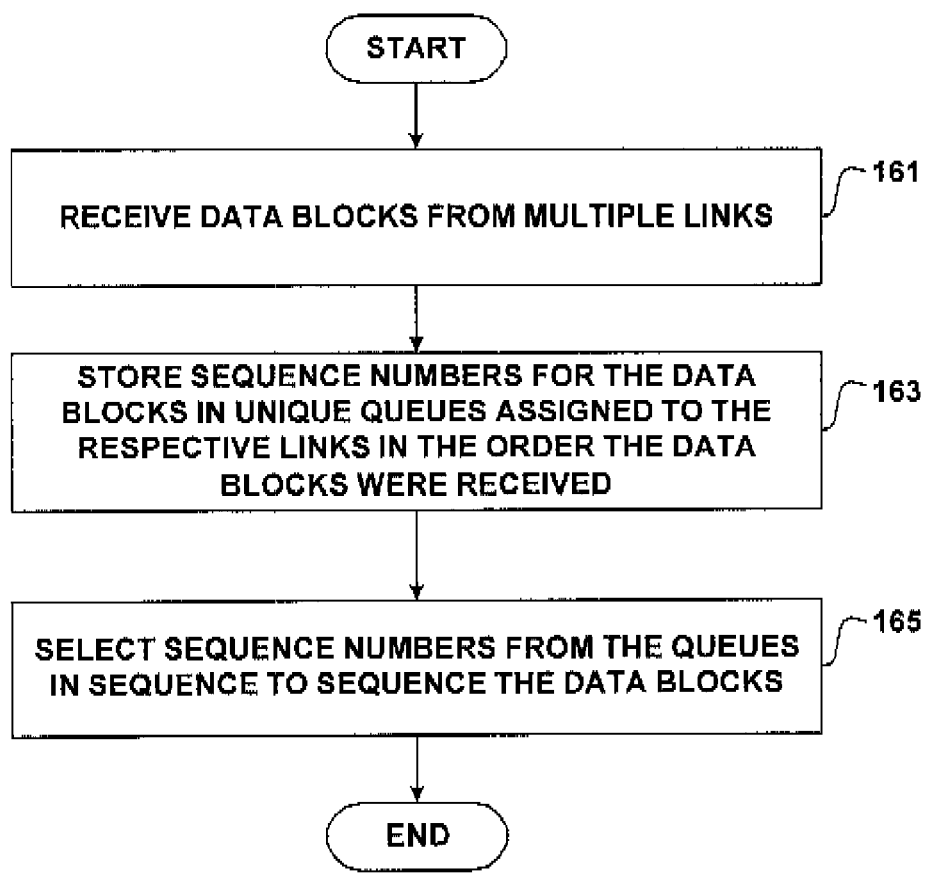

MULTI-LINK ROUTING

This application is a divisional of U.S. application Ser. No. 11/937,219, filed Nov. 8, 2007, which is a divisional of U.S. application Ser. No. 09/885,223, filed Jun. 20, 2001, now U.S. Pat. No. 7,315,900, the entire contents each of which are incorporated herein by reference.

FIELD

The invention relates to routing data over computer networks and, more particularly, to supporting multi-link protocols in computer networks.

BACKGROUND

A computer network is a collection of interconnected computing devices that can exchange data and share resources. In a packet-based network, such as the Internet, the computing devices communicate data by dividing the data into small data blocks called packets, which are individually routed across the network from a source device to a destination device. The destination device extracts the data from the packets and assembles the data into its original form. Dividing the data into packets enables the source device to resend only those individual packets that may be lost during transmission.

Routing devices within the network, often referred to as routers, maintain tables of routing information that describe available routes through the network. A "route" can generally be defined as a unit of information that defines a path between two locations on the network. Upon receiving an incoming data packet, the router examines header information within the packet to identify the destination for the packet. Based on the header information, the router accesses the routing table, selects an appropriate route for the packet and forwards the packet accordingly.

The connection between two devices on a network is generally referred to as a link. The link may be a physical transmission line such as a copper wire, a coaxial cable, or any of a host of different fiber optic lines. In addition, the link may be a wireless link. As networks grow in size and complexity, devices such as routers and switches can be used to manage and improve data transfer between the various computer devices in the network. Large computer networks, such as the Internet, may include a collection of networks connected by routers that are configured to route data between the networks and computer devices in those networks.

A variety of protocols have been developed to manage and improve data block transfer between the various devices and networks. One class of protocol that has been developed to improve data block transfer is referred to as "multi-link" protocol, in which a sequence of data can be transferred between two devices via more than one link. For example, a subset of the packets can be sent over one link, while the remaining packets in the sequence can be sent over one or more other links. In addition, multi-link protocol may allow a single packet to be transferred over more than one link. For example, the multi-link protocol may break a packet into even smaller data blocks, called fragments, and then send some fragments over one link and other fragments over one or more other links. Multi-link Point to Point Protocol (PPP) (RFC-1990) and Multi-link Frame Relay (FRF.15 and FRF.16) are two current protocols that allow multiple physical links to be treated by a router as a single logical link.

Communicating data blocks such as packets or fragments over multiple links can cause the data blocks to be received in a different sequence than the sequence in which they were transmitted, requiring the data blocks to be "re-sequenced" at the destination device. For example, assume packet A is fragmented into fragments $A_1$, $A_2$, and $A_3$. Packets $A_1$ and $A_3$ may be sent over $link_1$, while $A_2$ is sent over $link_2$. Due to differing propagation delays of $link_1$ and $link_2$, fragments $A_1$ and $A_3$ may be received from $link_1$ before fragment $A_2$ is received from $link_2$.

SUMMARY

In general, the invention provides a multi-link service card (MLSC) for use in a router. The MLSC allows the router to support multi-link protocols by directing the sequencing and/or assembly of inbound data blocks. In addition, the MLSC may direct the fragmentation of outbound data blocks or the division of a sequence of outbound data blocks for transmission over multiple links. In this manner, existing routers can easily be retrofitted with multi-link capabilities.

The router may include a number of interface cards (IFCs). The MLSC may be viewed by the router in the same way as the other IFCs. For this reason, the MLSC can be viewed as a virtual port of the router. The router may send data blocks to the virtual port and may receive data blocks from the virtual port. The virtual port may perform tasks that facilitate multi-link capabilities in the router.

In one embodiment, the invention provides a method that includes receiving data blocks in one or more interface cards according to a multi-link protocol and sending the data blocks to a service card for sequencing. The data blocks may be packets or fragments, and the service card may be a multi-link service card that is not directly coupled to any of the links. Alternatively, the multi-link service card may be integrated as part of an interface card. The method may also include sending the data blocks to the service card a second time for fragmentation before sending the data blocks to the interface cards for communication over the network.

In another embodiment, the invention provides a router that includes an interface card for receiving a set of data blocks from a source within a computer network according to a multi-link protocol, and a multi-link service card. The router may also include a routing control unit coupled to the interface card and the multi-link service card, to forward the set of data blocks from the interface card to the multi-link service card for sequencing. The router may include a plurality of interface cards and/or a plurality of multi-link service cards.

The routing control unit may include a packet forwarding engine coupled to the interface card and the multi-link service card. In addition, the routing control unit may include a interface card concentrator that couples the interface card and the multi-link service card to the packet forwarding engine. Moreover, the routing control unit may include a routing engine coupled to the packet forwarding engine. The routing control unit may forward sequenced data blocks to the multi-link service card for fragmentation.

In another embodiment, the invention provides a router that includes an interface card for receiving data blocks from a computer network and an interface card for sequencing the data blocks. In another embodiment, the invention provides a router that includes an interface card for receiving data blocks from a computer network and an interface card for fragmenting the data blocks.

In another embodiment, the invention provides a multi-link service card including an input logic unit that receives data blocks; a sequencer unit, coupled to the input logic unit, that sequences the data blocks; and an output logic unit, coupled to the sequencer unit, that sends sequenced data blocks. The multi-link service card may also include a memory logic unit, coupled to the input logic unit and the output logic unit, that stores at least part of the data blocks during sequencing.

The input logic unit may include an input buffer, an unprocessed buffer and a parser. The output logic unit may include an output buffer, a processed buffer and a fragmenter-assembler module, and may fragment sequenced data blocks. The memory logic unit may include a memory device such as synchronous dynamic random access memory (SDRAM), a data memory control, and data state logic. The sequencer unit may include a reorder module, a packet builder that builds packets from sequenced data blocks, a sequencer memory device such as SDRAM, a sequencer memory control and sequencer state logic.

In another embodiment, the invention provides a method that includes receiving data blocks from multiple links, and storing sequence numbers of the data blocks in data queues in the order the data blocks were received. The data blocks received from each link may be stored in a unique queue assigned to the respective link. The method may also include selecting sequence numbers from each queue in sequence to sequence the data blocks. The method may also include polling head pointers associated with the queues for a particular sequence number and moving header information associated with the selected sequence numbers to a processed memory location.

Additional details of these and other embodiments are set forth in the accompanying drawings and the description below. Other features, objects and advantages will become apparent from the description and drawings, and from the claims.

BRIEF DESCRIPTION OF THE DRAWINGS

FIGS. 6 and 7 are block diagrams of a multi-link service card (MLSC) consistent with the principles of the invention.

FIGS. 9-13 are flow diagrams illustrating example modes of operation of the router consistent with the principles of the invention.

DETAILED DESCRIPTION

In general, the invention is directed to techniques for supporting multi-link protocols within a computer network. The techniques facilitate the sequencing of data blocks, such as packets, received from a multi-link connection by directing the blocks to a service card. Similarly, packets destined for transmission over a multi-link connection can be directed to the service card for partitioning and routing to one of the links. In addition, the service card can be used to fragment individual packets and route the fragments to one or more links, or reassemble fragmented packets. The service card can be used to enhance the capabilities of legacy routers. In particular, the service card can be added as an upgrade to routers that were not originally configured to support multi-link protocols. In this manner, the invention provides a flexible and efficient mechanism for supporting multi-link capabilities within a router.

Figure 1:
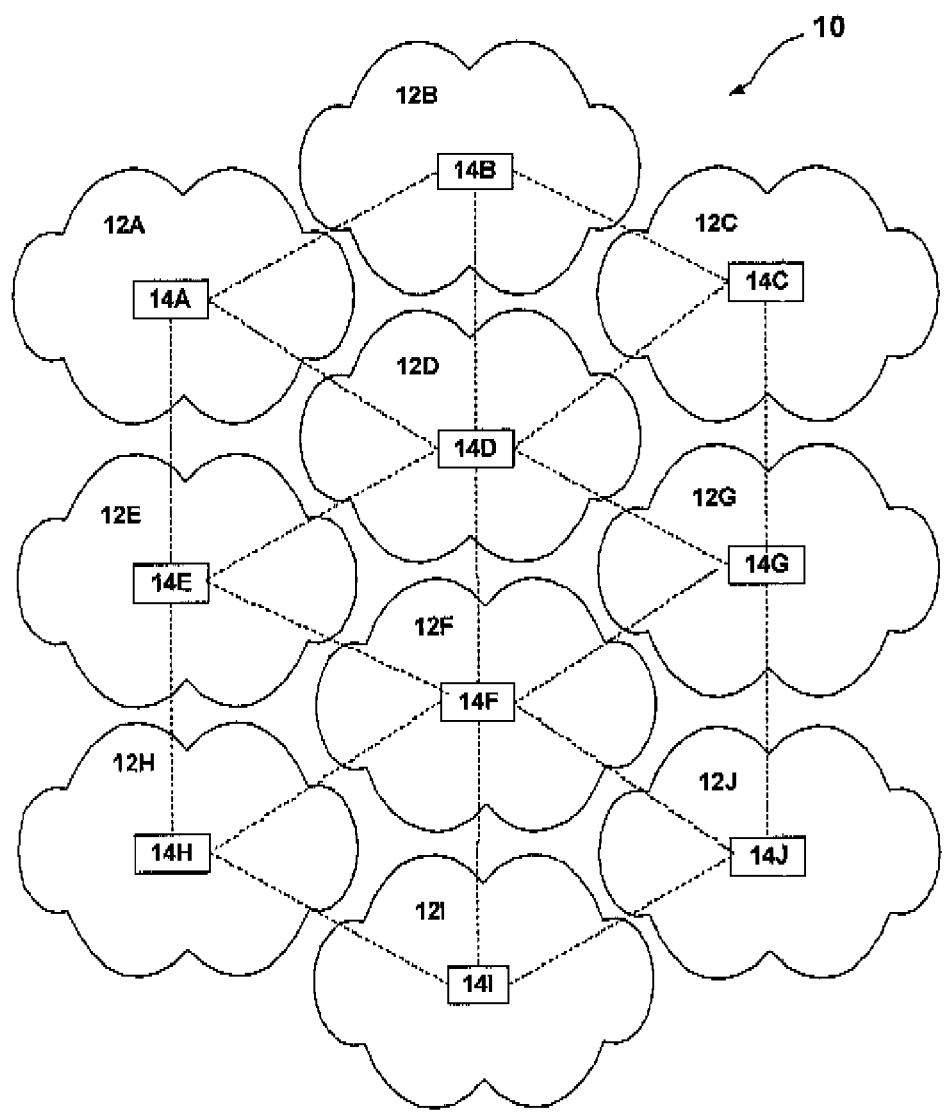
FIG. 1 is a block diagram illustrating an exemplary computer network.

FIG. 1 is a block diagram illustrating a computer network 10 in which a group of autonomous systems (AS) 12A-12J are interconnected by a number of routers 14A-14J. Each AS 12 may include any number of interconnected computer devices. Data blocks, such as packets or packet fragments, may be communicated through network 10 over respective communication links (indicated by dotted lines) that interconnect routers 14A-14J. Each individual router 14 may transfer data blocks through network 10 according to a routing algorithm or a local routing table. In addition, each router 14 may maintain a routing table or algorithm that describes the available paths through network 10. When a router 14 receives a packet, for example, the router 14 may select the "next hop" for the packet according to the routing table or algorithm, and may forward the packet over the appropriate link. The next hop for a packet is the next destination for the packet, given a particular route chosen by the router 14 sending the packet.

Multi-link protocols, such as Multi-Link PPP and Multi-Link Frame Relay, allow connected routers 14 to treat multiple links between one another as a single logical link. In other words, multi-link protocols allow data blocks of a sequence of data blocks to be transferred from one router 14 to another router 14 in parallel using multiple links. Using multiple links to transfer a sequence of data blocks can increase bandwidth and, therefore, improve the data transfer rate. However, communicating the data blocks over multiple links can cause the data blocks to be received in a different order than the order in which they were transmitted, requiring the data blocks to be re-sequenced.

Figure 2A:
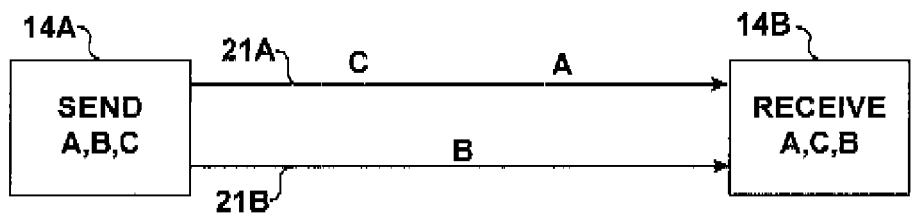
FIGS. 2A-2C are block diagrams illustrating exemplary communication of data blocks over multiple links according to a multi-link protocol.

As shown in FIG. 2A, for example, a sequence of data blocks {A,B,C} sent by router 14A over multiple links 21A and 21B may be received in temporal order as {A,C,B} by router 14B. Router 14A may simultaneously transmit the first two packets, A and B, over links 21A and 21B, followed by packet C on link 21A. Due to differing propagation delays of links 21A and 21B, however, the packets may be received out of order. As shown, router 14B may receive packets A and C before packet B, even though packet B was sent by router 14A earlier in time than packet C.

Figure 2B:
Figure 2C:
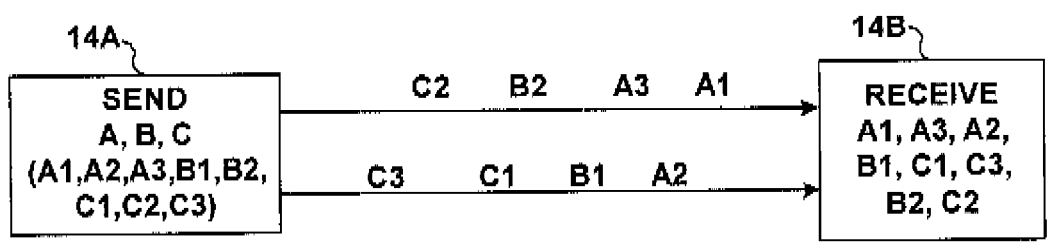

Multi-link protocols may also be used to break single packets into packet fragments, and send the fragments over multiple links to improve throughput. This, however, raises the same problems addressed above. For example, differing propagation delays of the respective links may cause the fragments to be received out of order. FIG. 2B, for instance, illustrates a scenario where an outbound packet A is fragmented into fragments {A1, A2, A3} before being sent over multiple links. As shown, fragment A3 may be received before fragment A2 even though fragment A2 was sent earlier in time than packet A3. As packets are fragmented and sent over multiple links, the problem may compound, such that fragments for different packets overlap, as illustrated by FIG. 2C.

Upon receiving the packets, router 14B re-sequences the packets according to the techniques described herein. More specifically, as described in detail below, router 14B includes a multi-link service card (MLSC) to ensure that data blocks, such as packets or fragments, are properly sequenced when they are received. In one configuration, router 14B can receive one or more multi-link service cards using ports designed to receive conventional interface cards (IFCs). Thus, each MLSC may have the same pin interconnection interface as a conventional IFC. In this manner, routers that were not originally adapted to support multi-link protocols can be more readily retrofitted with a multi-link service card, thus providing the device with multi-link capabilities.

Figure 3:
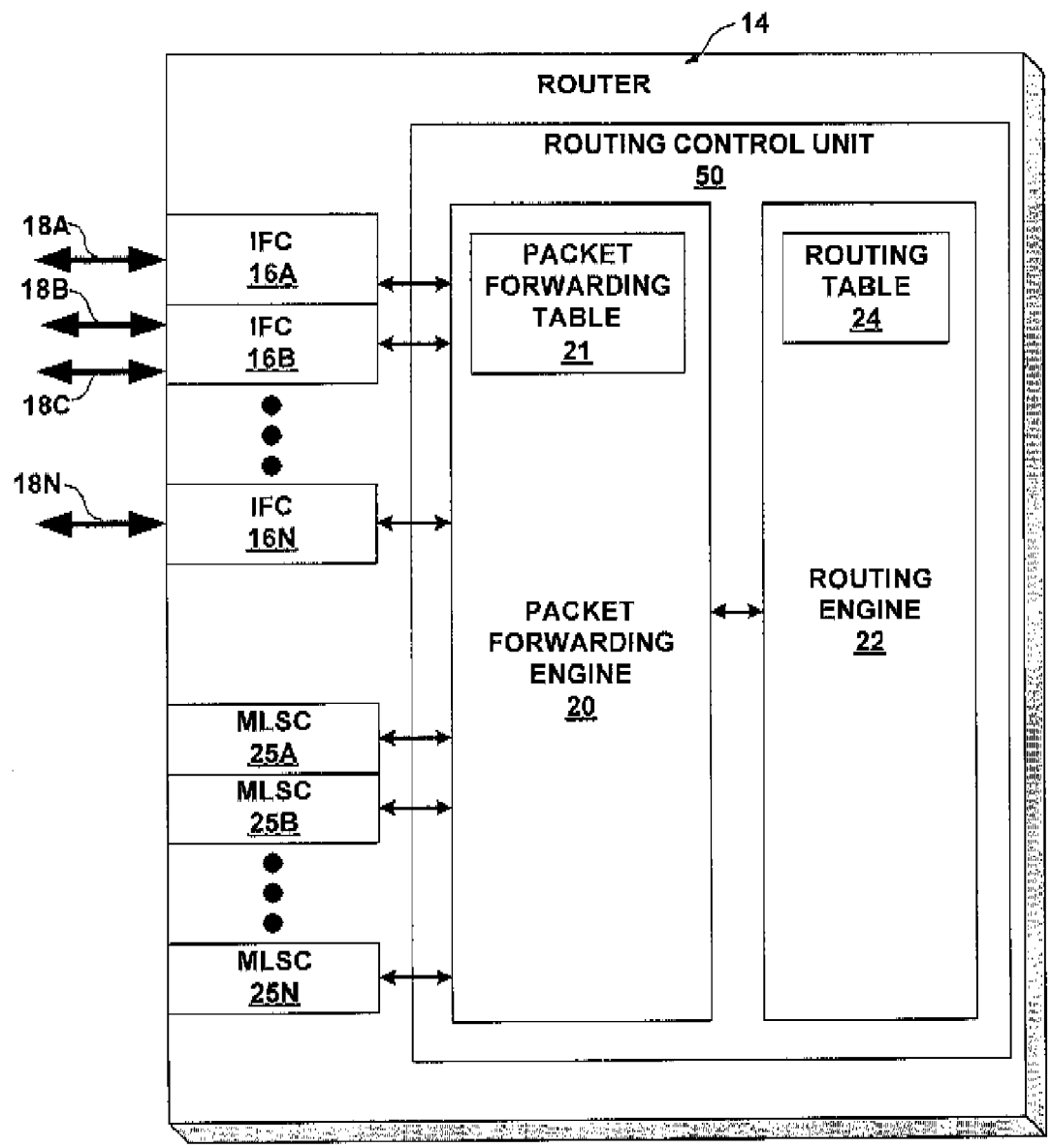
FIG. 3 is a block diagram illustrating an example router consistent with the principles of the invention.

FIG. 3 is a block diagram illustrating an example router 14 consistent with the principles of the invention. Router 14 includes one or more interface cards (IFCs) 16A-16N for interfacing with network ports 18A-18N. Each IFC 16 may include one or more network ports 18. A network port 18 may include a single link, or alternatively a single network port may include a plurality of links. For instance, network port 18A may be a T3 line. The T3 line may be treated as a single link, or the T3 line may be channelized, for example, into a number of T1 lines. In the later case, each T1 line in the channelized T3 line may be treated as a separate link for multi-link protocols.

Router 14 may use multi-link protocols to combine a plurality of physical links into a single logical link, referred to as a "bundle." The particular links that make up a particular bundle can be defined by router 14 and the multi-link protocol. For example, in accordance with some embodiments of the invention, router 14 may logically associate links connected to different physical ports as part of the same bundle. Indeed, router 14 may even logically associate links connected to ports of different IFCs 16 as being part of the same bundle.

Routing control unit 14 routes inbound packets received from a port 18 to an appropriate outbound port 18 in accordance with routing information stored in routing table 24. In one embodiment, control unit 50 may comprise routing engine 22 and forwarding engine 20. Routing engine 22 maintains routing information within routing table 24 to represent a network topology. Forwarding engine 20 analyzes routing table 24 prior to receiving packets and pre-selects routes to be used when forwarding packets. Forwarding engine 20 stores the selected routes in forwarding table 21. Upon receiving an inbound packet, forwarding engine 20 examines information within the packet to identify the destination of the packet. Based on the destination, forwarding engine 20 selects an available route and forwards the packet to one of the IFC's 16.

In accordance with the invention, router 14 may include one or more service cards such as multi-link service cards (MLSC) 25A-25N. Each MLSC 25 facilitates the sequencing of data blocks, such as packets or fragments, that are received from a source via a multi-link connection. In addition, each MLSC 25 may facilitate fragmentation so that outgoing data blocks can be fragmented and sent over multiple links. Moreover, MLSC 25 may allow a stream of outbound data blocks to be divided for transmission over multiple links. For simplicity, many details of the operation of MLSC 25 will be provided by explaining the sequencing and assembling of fragments and the fragmentation of a packet into fragments. Of course, the same or similar techniques could be used to sequence packets, or to break up a large stream of packets for transmission over multiple links. In general, the methods and techniques for sequencing, assembly, fragmentation and division that are described in detail below can be implemented with any format of data blocks, including packets, fragments, or any other data block.

When a fragment is received from a multi-link source in one or more inbound ports 18, routing control unit 50 examines header information within the fragment identifying the fragment as coming from a multi-link source, and identifies the destination of the fragment as MLSC 25. Routing control unit 50 adds header information to the fragment that will be used by MLSC 25, and forwards the fragment to MLSC 25. In this manner, a collection of fragments that make up a packet are forwarded to the same MLSC 25. MLSC 25 sequences the fragments and assembles the fragments into a sequenced packet. Once sequenced, the packet is forwarded from MLSC 25 back to routing control unit 50. Upon receiving an inbound packet, routing control unit 50 identifies the destination of the packet to determine a route, determines the port associated with the route, adds appropriate header information to the packet, and forwards the packet to the appropriate port.

If the packet is to be forwarded over multiple links, it may need to be fragmented. MLSC 25 can be used to facilitate the fragmentation. Thus, if the packet is to be forwarded over multiple links, the packet may be forwarded back to MLSC 25 from routing control unit 50 for fragmentation. MLSC 25 may fragment the packet and then forward the fragments back to routing control unit 50. Routing control unit 50 then identifies the destination of the fragments, determines the outgoing port for each fragment, adds appropriate header information to the fragments and forwards the fragments to the appropriate ports. In this manner, the fragments can be transmitted over multiple links according to a multi-link protocol.

Figure 4:
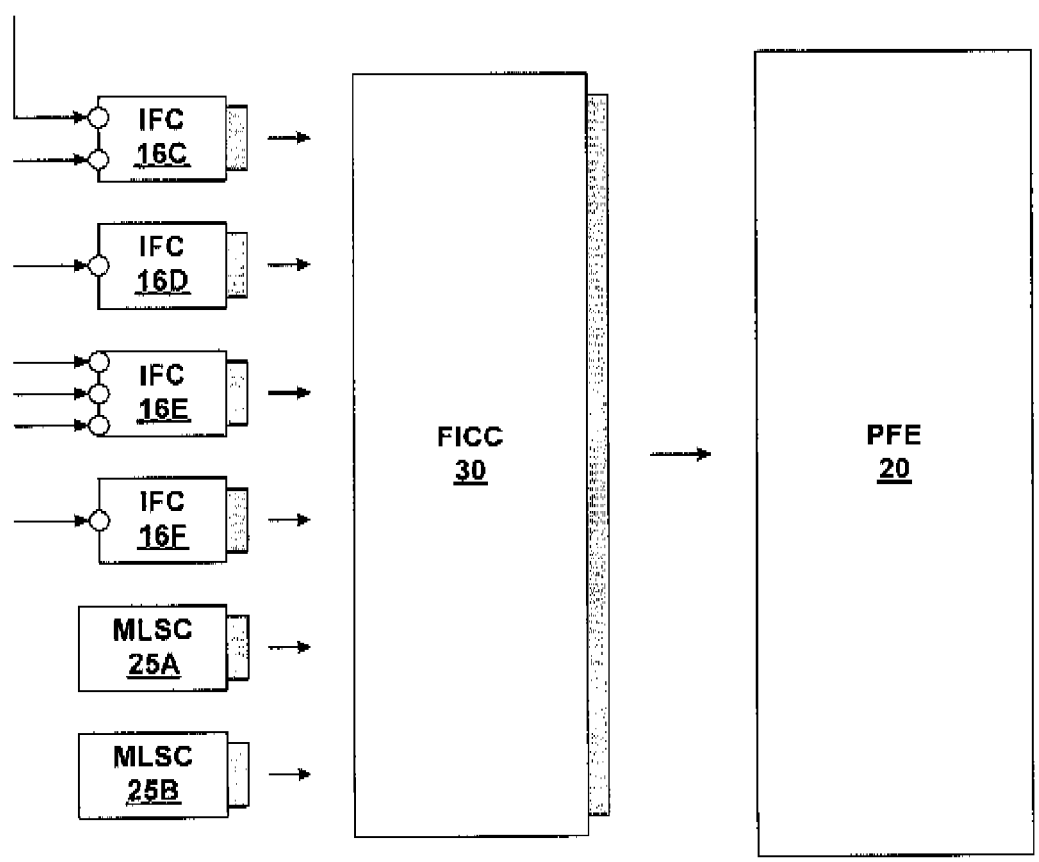
FIG. 4 illustrates a flexible interface card concentrator (FICC) for coupling a plurality of cards to a packet forwarding engine of the router.

As shown in FIG. 4, router 14 may include a flexible interface card concentrator (FICC) 30 that receives plurality of cards and couples the cards to packet forwarding engine 20. For instance, as shown in FIG. 4, FICC 30 couples IFCs 16C-16F and MLSCs 25A and 25B to packet forwarding engine 20. FICC 30 may include memory for storing data blocks that are received. Packet forwarding engine 20 may remove header information from the data blocks stored in FICC 30 to facilitate the routing of the data blocks, regardless of which card received the data block.

When packet forwarding engine 20 directs FICC 30 to forward a data block to an MLSC 25, possibly for sequencing, the MLSC 25 processes the data block and then communicates the data block back to FICC 30. Packet forwarding engine 20 processes the data block in the same way as any other inbound data block. In this manner, a data block may make a plurality of trips through an MLSC 25 before being ultimately forwarded on to a destination device over the network. For example, inbound packets from a multi-link connection may be forwarded to an MLSC 25 for sequencing, and the sequenced packets may be again forwarded to an MLSC 25 a second time to be fragmented before being routed over the network.

In one embodiment, the MLSC 25 is integrated as part of an IFC 16. For example, the card may have multiple logical ports. Some logical ports may be physically connected to other network devices via one or more links. Other logical ports may be virtual ports that are not connected to other network devices, but include the MLSC logic that is described in detail below.

Figure 5A:
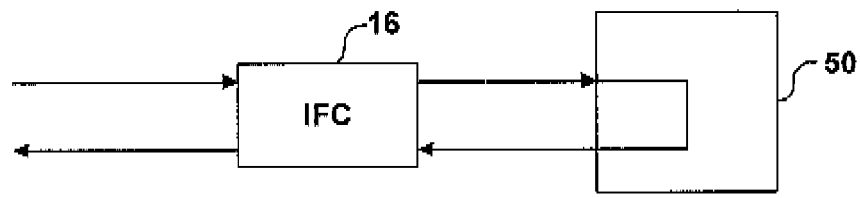
FIGS. 5A-5C are block diagrams illustrating data flow through the router consistent with the principles of the invention.
Figure 5B:
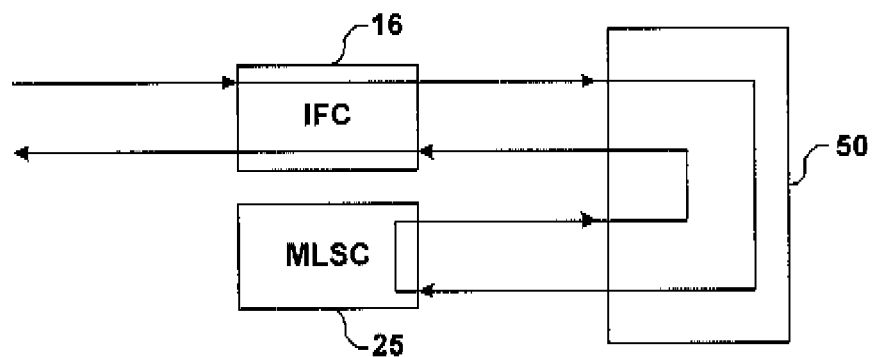
Figure 5C:
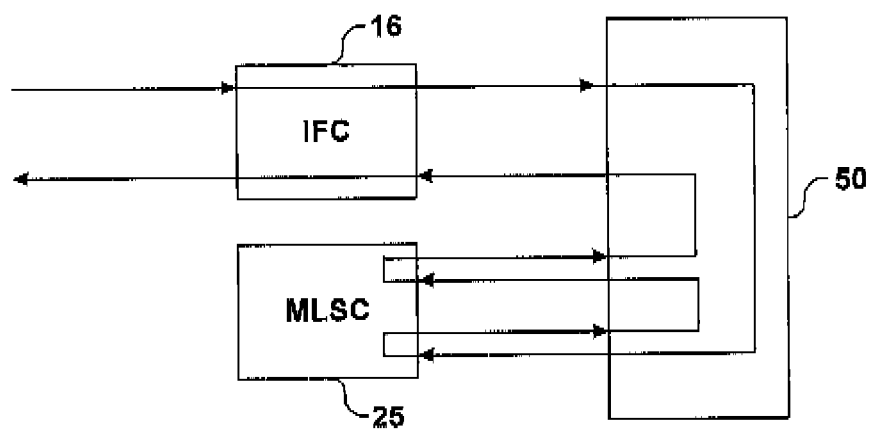

FIGS. 5A-5C are block diagrams illustrating three exemplary data flows through a router consistent with the principles of the invention. Routing control unit 50, for example, may include a packet forwarding engine, a routing engine, and a flexible interface card concentrator (FICC), although the scope of the invention is not limited in that respect. FIG. 5A illustrates the normal data flow through a router. Notably, FIG. 5A illustrates how, during the normal data flow through a router, the data block is forwarded to router control unit 50 for processing and then forwarded back to a port of IFC 16 for transmission over the network. The incoming port and outgoing port often reside on different IFCs, however, only a single IFC 16 is illustrated for simplicity.

FIG. 5B illustrates the data flow through a router when an MLSC 25 is used for either sequencing or fragmentation. FIG. 5B illustrates that when MLSC 25 is used according to an embodiment of the invention, a data block may make multiple passes through router control unit 50. For example, data blocks received from a plurality of links in one or more interface cards according to a multi-link protocol may be sent to router control unit 50. The data blocks may then be sent out of router control unit 50 to one or more service cards, such as MLSC 25, for sequencing. After sequencing, the sequenced data blocks may be sent back to router control unit 50 for routing, before being ultimately sent to one or more interface cards for communication to a destination device over a computer network.

FIG. 5C illustrates the data flow of data blocks that are both sequenced and fragmented. For example, if fragments are received according to a multi-link protocol, the fragments may need to be sequenced and assembled into a sequenced packet. Then, if the sequenced packet is sent over the network according to a multi-link protocol, the packet may need to be fragmented. As shown in FIG. 5C, the data flows through the MLSC 25 several times before being ultimately communicated over a computer network.

FIG. 6 is an exemplary block diagram of a multi-link service card (MLSC) 25 consistent with the principles of the invention. As shown, MLSC 25 may include an input logic unit 62 and an output logic unit 64 both coupled to a sequencer unit 66. In addition, MLSC 25 may include a memory logic unit 68 coupled to the input logic unit 62 and the output logic unit 64.

MLSC 25 may be used to sequence and assemble inbound data blocks, and may also be used to fragment outbound data blocks or to divide a stream of outbound data blocks for transmission over multiple links. For instance, MLSC 25 may be used to sequence and assemble inbound fragments into a packet, or to divide a packet into multiple fragments for transmission over multiple links. In addition, MLSC 25 may be used to sequence inbound packets, or to divide a stream of packets for transmission over multiple links. Although MLSC 25 may perform these operations using the same logic flow, it is easier to explain the operations in turn.

When fragments are received by MLSC 25 for sequencing, input logic unit 62 removes header information from the respective fragments and stores the remaining data, i.e., the payload, in memory logic unit 68. The header information is forwarded to sequencer unit 66, which sequences the fragments according to the header information and forwards the sequence to output logic unit 64. Output logic unit 64 accesses memory logic unit 68 and outputs the fragments in sequence.

Sequencer unit 66 may also build the sequenced fragments into packets before forwarding the sequence on to output logic unit 64. In such a case, output logic unit 64 may access memory logic unit 68 and output a sequenced packet.

When a data block is received by MLSC 25 to be divided for transmission over multiple links, input logic unit 62 removes header information from the data block and stores the payload in memory logic unit 68. The header information is forwarded through the sequencer unit 66 to output logic unit 64. Output logic unit 64 divides the data blocks into smaller data blocks, e.g., divides a packet into fragments, accesses memory logic unit 68, and generates and assigns link identifiers and sequence numbers to the respective smaller data blocks. Multi-link headers can then be added to the respective smaller data blocks before the smaller data blocks are sent over the network according to the multi-link protocol.

Figure 7:
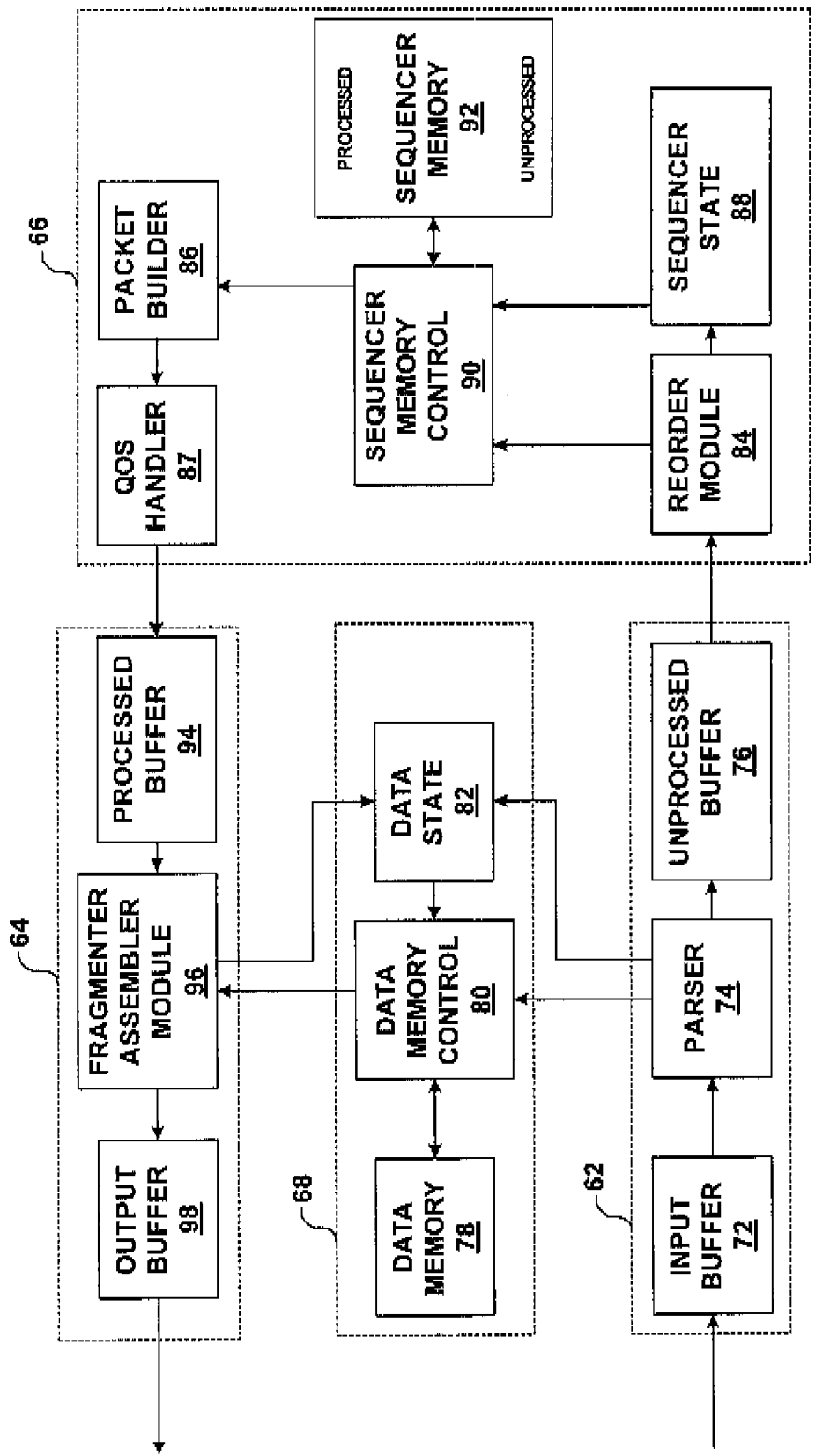

FIG. 7 illustrates one exemplary implementation of MLSC 25 consistent with the principles of the invention. Input logic unit 62 may include an input buffer 72, a parser 74, and an unprocessed buffer 76. Input buffer 72 temporarily stores incoming data blocks. Parser 74 removes header information from the respective data blocks, sends the remaining data, i.e., the payload, to memory logic unit 68, and sends the header information to unprocessed buffer 76. In addition, parser 74 may maintain and update a valid window for defining particular data blocks within a sequence of data blocks that will not cause problems in the sequencer unit 66.

Memory logic unit 68 includes a data memory device 78, such as synchronous dynamic random access memory (SDRAM) coupled to a data memory control 80. Data memory control 80, for example, may be an SDRAM controller that manages the data memory device 78. Memory logic unit 68 may also include data state logic 82 for managing the data state in data memory 78. Data state logic 82, for example, may maintain the data structures within data memory device 78, including the size and structure of queues. In addition, data state logic 82 manages the pointers of the queues and maps header information to memory locations in the data memory device 78. For example, in one embodiment, separate queues are maintained for data received from each respective link of a bundle of links.

The header information stored in unprocessed buffer 76 is forwarded to sequencer unit 66 for sequencing. For example, sequencer unit 66 may include a reorder module 84 for sequencing incoming fragments. Sequencer unit 66 may also include a packet builder 86 that determines when a particular sequence of fragments comprises a packet, and then forwards the sequenced header information on to output logic module 64. In some embodiments, sequence unit 66 may also include a quality of service (QOS) handler 87.

Sequencer unit 66 may also include sequencer state logic 88, sequencer memory control 90, and sequencer memory device 92. Sequencer memory device 92 may be a memory device such as SDRAM and sequencer memory control 90 may be an SDRAM controller for managing the sequencer memory device 92. In one embodiment, sequencer memory device 92 and data memory device 78 are the same physical memory device, possibly partitioned into sequencer memory and data memory. Sequencer state logic 88, for example, maintains and manages the data structures within the sequencer memory device 92. Again, in one embodiment, separate queues are maintained for data received from each respective link of a bundle of links.

Output logic unit 64 may include a processed buffer 94 for temporarily storing sequenced sets of data, such as a sequenced packet. Output logic unit 64 also includes a fragmentor-assembler module 96 for accessing memory logic unit 68 and appending the appropriate header information to sequenced data blocks. The data blocks can then be temporarily stored in output buffer 98 before being sent out of MLSC 25.

Figure 8A:
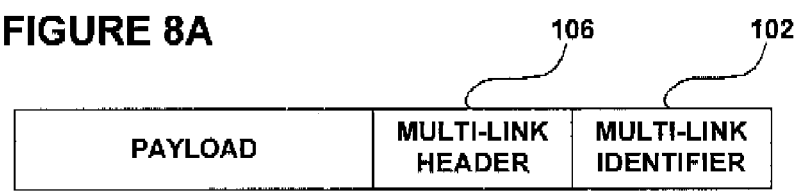
FIGS. 8A-8B illustrate an exemplary format of a data block.
Figure 8B:
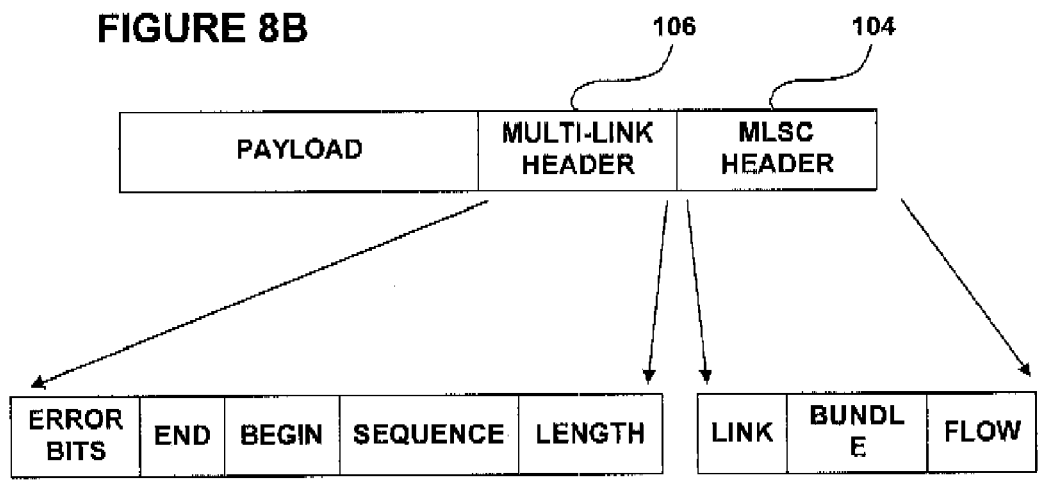

FIGS. 8A-8B illustrate formats of an exemplary data block. In particular, FIG. 8A illustrates the format of an exemplary data block received by a router 14 according to a multi-link protocol. Once received, router control unit 50 may remove header information such as multi-link identifier to determine that the data block should be forwarded to an MLSC 25 for sequencing. The routing control unit 50 may append an MLSC header 104 as shown in FIG. 8B.

The MLSC header 104 and the multi-link header 106 are used by MLSC 25 to process data blocks. As shown in FIG. 8B, MLSC header 104 may include bit fields defining the link, bundle and flow associated with the data block. The bundle field defines the bundle in which the data block was received. The link field defines the link within the bundle in which the data block was received, and the flow field defines whether the data block is being sent to MLSC 25 for sequencing or for fragmentation.

Multi-link header 106 is a header that was added to the data block when it was sent to router 14 according to a multi-link protocol. As shown, the multi-link header 106 may include a begin field defining the first data block of a set of data blocks, an end field defining the last data block of the set, a sequence field defining the number of blocks in the set, and an error bits field. MLSC 25 uses the MLSC header 104 and multi-link header 106 for sequencing and/or fragmentation, and uses the multi-link header 106 for packet building. Additional fields could also be added to MLSC header 104. For example, a quality of service field could be added for prioritization of data blocks as described in greater detail below. In addition, a field could be added to define the protocol associated with the data blocks. These or other fields could be added, depending on the specific implementation.

Referring again to FIG. 7, reorder module 84 causes data to be stored in at least one data structure for each bundle supported by the multi-link implementation. As data blocks are received, reorder module 84 stores sequence numbers of the header information associated with data blocks received from different bundles in the respective data structure for the bundle. Before the header information is sequenced, it is stored in the unprocessed portion of sequencer memory device 92, e.g., in unprocessed queues. For each bundle, reorder module 84 continuously polls to see if the next sequence number in the sequence of data blocks for that bundle has been received. If so, reorder module 84 removes that sequence number from the data structure and causes the header information associated with that sequence number to be stored in the processed portion of sequencer memory device 92, e.g., in a processed queue. Reorder module 84 then increments the sequence number for that bundle to look for the next data block for that bundle.

Packet builder 86 examines sequenced header information in the processed portion of sequencer memory device 92. Once packet builder 86 detects sequenced header information of a full packet in the processed portion of sequencer memory device 92, packet builder removes that header information and forwards it on to output logic unit 64. Because reorder module 84 only causes sequenced header information to be stored in processed portion of sequencer memory device 92, packet builder 86 can easily detect sequenced packets by searching for set beginning and end bits of the multi-link headers 106. For example, when packet builder 86 detects a set beginning bit and a set end bit within a sequence stored in processed portion of sequencer memory device 92, packet builder 86 knows that it has detected the headers of a sequenced packet. Thus, packet builder 86 can remove the sequenced header information defining the packet and forward it on to output logic unit 64.

In some cases, quality of service (QOS) handling may also be performed in MLSC 25. In those cases, packet builder 86 forwards the header information to QOS handler 87, which performs quality of service handling prior to forwarding the header information on to output logic unit 64. Quality of service handling is discussed in greater detail below. In general, quality of service processing can be applied when incoming data blocks need to be fragmented by MLSC 25.

Figure 9:
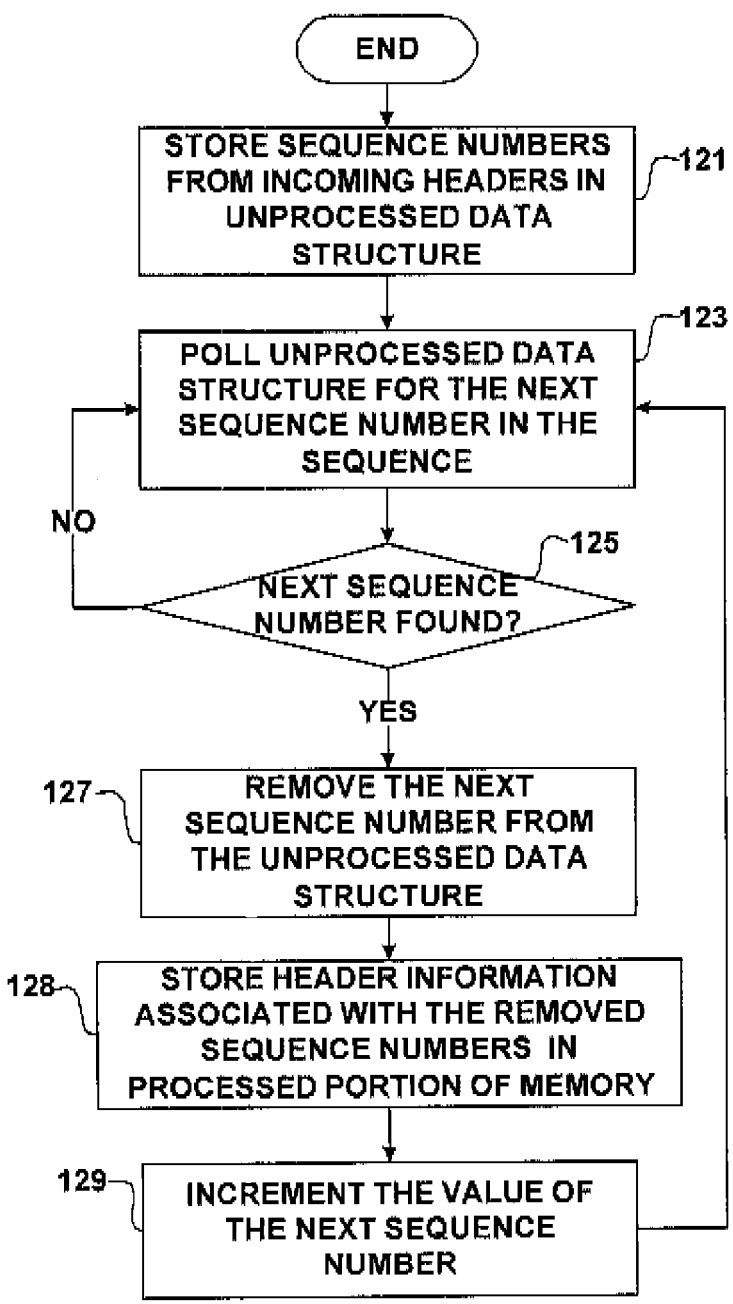

FIG. 9 is a flow diagram showing an exemplary operation of a sequencer unit 66 consistent with the principles of the invention. As shown, sequence numbers from incoming header information is stored in an unprocessed data structure (121). The unprocessed data structure is then polled (123) to search for the next sequence number in the sequence. If the next sequence number is found (yes branch of 125), then the sequence number is removed from the unprocessed data structure (127) and header information associated with the removed sequence number is stored in the processed portion of memory (128), e.g., in a processed queue. The value of the next sequence number is then incremented (129) and the unprocessed data structure is again polled for the next sequence number (123). In this manner, data blocks can be sequenced using header information such as the bundle field and the sequence field (as shown in FIG. 8B).

As discussed above, communicating data blocks such as packets or fragments over multiple links can cause the data blocks to be received in a different order than they were transmitted. However, one very powerful observation is that notwithstanding the fact that data blocks transmitted over multiple links may be received out of order; order is generally preserved on any given link. For this reason, maintaining a separate queue for each link in a given bundle can greatly enhance the speed at which data blocks can be sequenced.

If a separate queue is maintained for each link, the reorder module 84 can more easily poll for the next sequence number, and sequencer unit 66 may be able to move larger sets of sequenced data at a given time to the processed portion of sequencer memory device 92. Sequence numbers associated with each individual link can be stored in unique queues. Because order is preserved on any given link, reorder module 84 can poll the head pointer of respective queues for the next sequence number. Moreover, reorder module 84 can save power by simply examining the sequence numbers of incoming headers for each bundle and then polling the head pointers of the queues of a particular bundle only after receiving a next sequence number.

Figure 10:
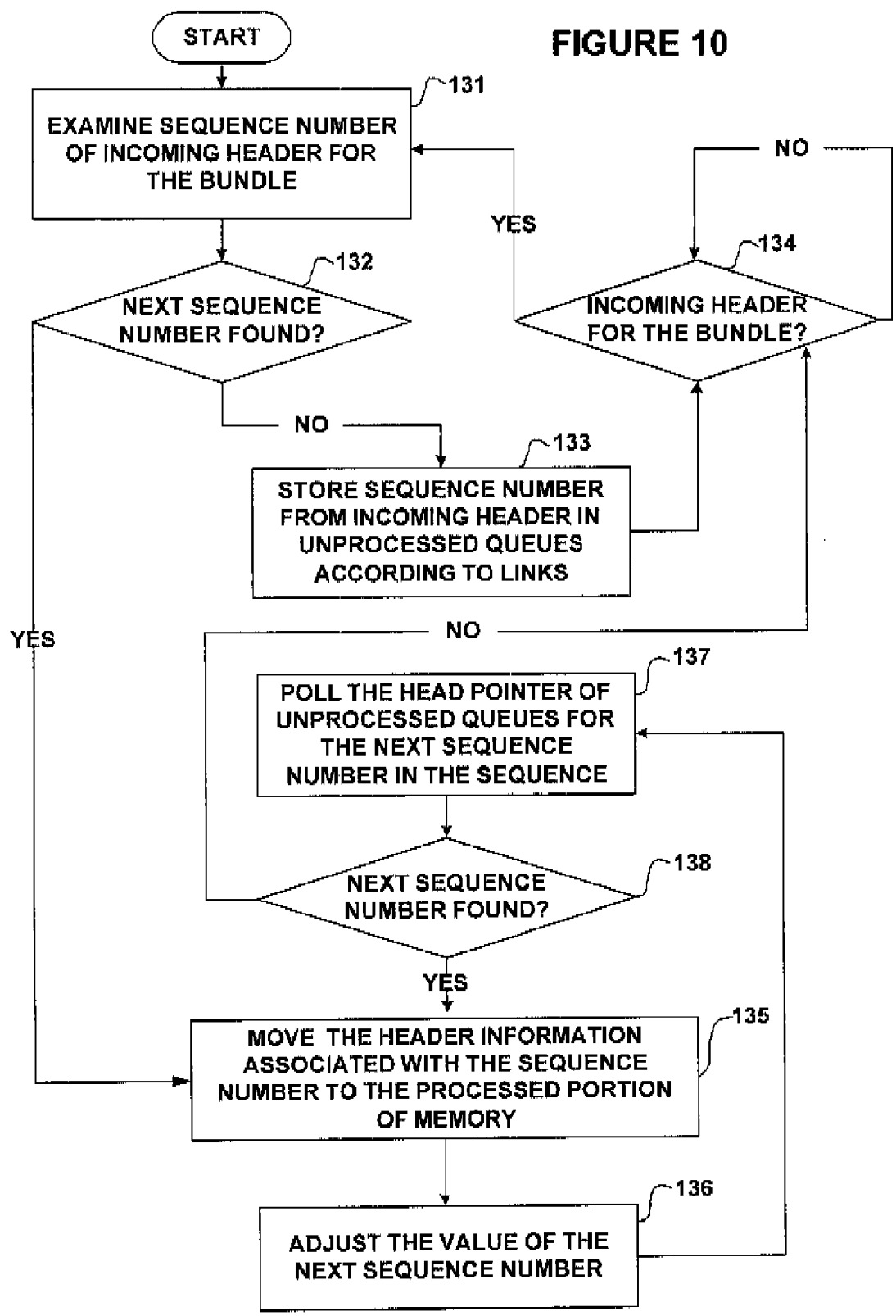

FIG. 10 is a flow diagram illustrating exemplary operation of a sequencer unit 66 using separate queues for each link in a given bundle. As shown, for each bundle, the sequence number of an incoming header is examined (131). If the next sequence number is not found (no branch of 132), the sequence number from the incoming header is stored in unprocessed queues according to links (133). The process may then wait until another incoming header is received for that bundle (yes branch of 134).

If, after examining the sequence number of an incoming header (131), the next sequence number is found (yes branch of 132), the header information associated with that sequence number is sent to the processed portion of memory (135) and the value of the next sequence number is incremented (136). The head pointers of the unprocessed queues are then polled for the next sequence number in the sequence (137). If the next sequence number is found (yes branch of 138), the sequence number is pulled from the queue and the header information associated with that sequence number is moved to the processed portion of memory (135). The value of the next sequence number is then incremented (136) and the head pointer of the unprocessed queues are again polled for the next sequence number in the sequence (137). If the next sequence number is not found (no branch of 138), the process may then wait until another incoming header is received for that bundle (yes branch of 134).

In operation, when a separate queue is maintained for each link in a bundle, a particular queue may continue to fill while the reorder module waits for the next sequence number for a given bundle. For example, assume the reorder module 84 is waiting for sequence number 15 of bundle one. If the queue associated with link one of bundle one contains sequence numbers 16-21, it will continue to fill if additional sequence numbers are received as the reorder module continues to wait for sequence number 15 of bundle one. Eventually, sequence number 15 of bundle one may be received.

Once received, the header information associated with sequence number 15 will be immediately sent to the processed portion of memory, and the reorder module 84 will increment to search for sequence number 16. Moreover, reorder module 84 will identify sequence number 16 of bundle one in the queue associated with link one of bundle one. As reorder module 84 continues to poll, sequence numbers 16-21 will be quickly removed from the unprocessed queue of link one bundle one, and the header information associated with those sequence numbers will be moved to the processed portion of memory. Reorder module 84 will then begin waiting for sequence number 22.

Sequencer unit 66 may also implement a timer and may adjust the value of the next sequence number if too much time elapses. For example, if a data block becomes lost or corrupted during data transmission, it may not be received or identified by router 14. The timer may ensure that the sequencer unit 66 does not continue to poll or wait for sequence numbers associated with lost or corrupted data blocks. In addition, if every queue for a particular bundle has a sequence number stored therein, and the process is still waiting for the next sequence number, the next sequence number can be incremented. In that case, the sequence number for which the process was waiting, was either lost, corrupted, or otherwise not received by the router 14.

Sequence numbers having values less than the next sequence number may also be polled. If found, an error can be declared. In other words, if a sequence number having a value less than the next sequence number is detected, an error can be declared. In that case, packets may have been sent over a link out of order, or an error may have occurred during transmission.

Once fragments have been sequenced, they are stored, in sequence, in the processed portion of sequencer memory device 92, e.g., in a processed queue. Packet builder 86 can then search for set beginning and end bits in the multi-link headers 106. For example, when packet builder 86 detects a set beginning bit and a set end bit within a sequence stored in a processed queue in the processed portion of sequencer memory device 92, packet builder 86 knows that it has detected header information for a sequenced packet. Thus, packet builder 86 can remove the sequenced header information and forward it on to output logic unit 64.

Figure 11:
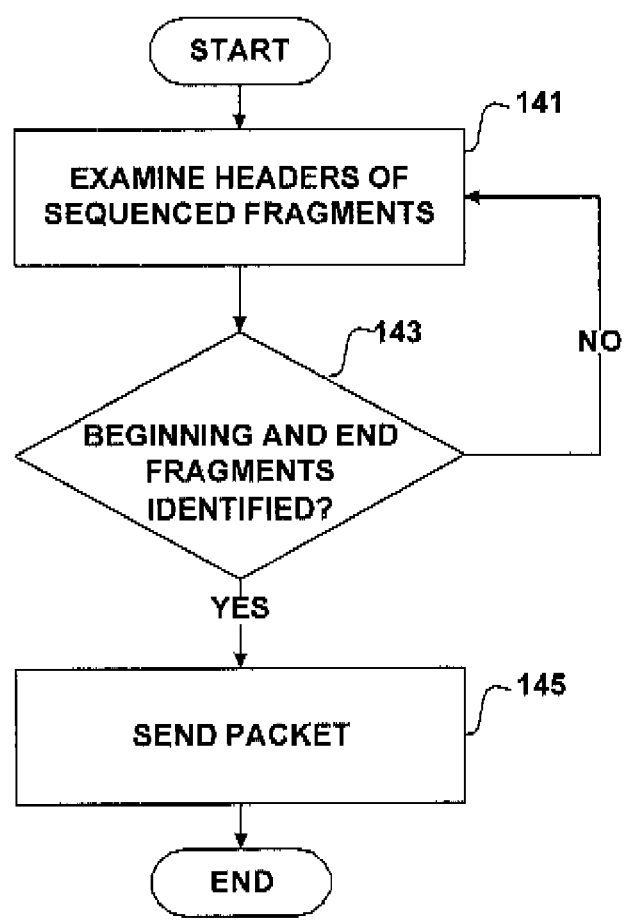

FIG. 11 is a flow diagram illustrating the process of building a sequenced packet from sequenced fragments. As shown, headers of sequenced fragments are examined (141). When beginning and ending fragments of a packet are identified (yes branch of 143), the packet can be sent (145). For example, the sequenced header information can be buffered and forwarded from sequencer unit 66 to output logic module 64. The packet can then be assembled in the assembler-fragmenter module 96 before being forwarded out of MLSC 25 and ultimately sent over the network.

Figure 12:
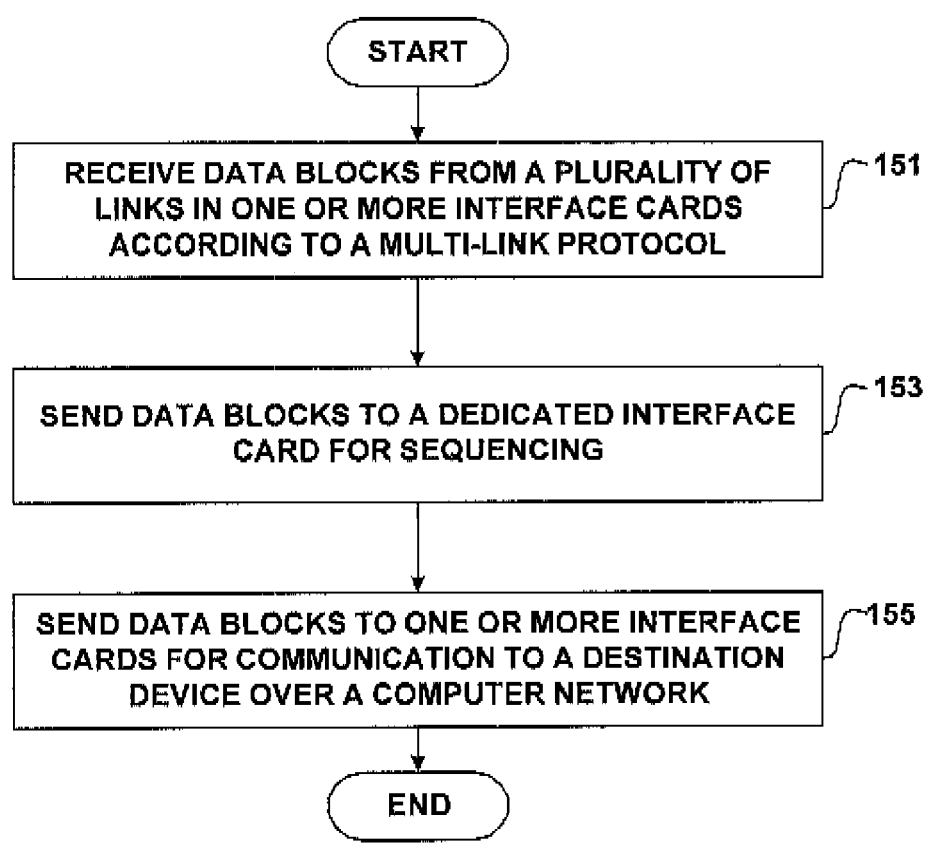

FIG. 12 is a flow diagram consistent with the principles of the invention. As shown, data blocks are received from a plurality of links in one or more interface cards according to a multi-link protocol (151). The data blocks are then sent to a service card, such as MLSC 25, for sequencing (153). Once sequenced, the data blocks are sent to one or more interface cards for communication to a destination device over a computer network (155).

FIG. 13 is another flow diagram consistent with the principles of the invention. As shown, data blocks are received from multiple links (161). Sequence numbers for the data blocks are then stored in unique queues assigned to the respective links in the order the data blocks were received (163). Sequence numbers can then be selected from each queue, in sequence, to sequence the data blocks (165).

As mentioned above, in addition to sequencing, MLSC 25 may perform fragmentation. In this manner, MLSC 25 can enhance the multi-link protocol capabilities of a router by enabling the router to fragment packets, for example, according to a multi-link protocol.

Referring again to FIG. 7, fragmenter-assembler module 64 can be used to perform fragmentation. The flow field of MLSC header 104 (as shown in FIG. 7B) can be used by MLSC 25 to determine whether the incoming data block is to be sequenced or fragmented. If the incoming data block is a fragment that needs to be sequenced, MLSC 25 will process the data block in the manner described above. However, if the incoming data block is a packet that needs to be fragmented, MLSC 25 may process the data block as described below.

When a packet is received by MLSC 25 for fragmentation, input logic unit 62 removes header information from the packet and stores the remaining data, i.e., the payload, in memory logic unit 68. The header information is forwarded to sequencer unit 66. The respective modules of sequencer unit 68, such as reorder module 84 and packet builder 86, identify the packet as a sequenced packet and forward it on to output logic unit 64. Again, the flow field of the MLSC header (as shown in FIG. 7B) may identify whether the data block is a fragment that needs to be sequenced or a packet that needs to be fragmented.

After identifying the packet as a sequenced packet and forwarding the sequenced packet on to output logic unit 64, the packet may be fragmented. For example, the fragmenter-assembler module 64 can fragment the packet by breaking the packet into smaller data blocks and generating and assigning link identifiers and sequence numbers to the respective data blocks. The fragmenter-assembler module 64 can then add multi-link headers on the respective data blocks. The fragmented data blocks can then be sent out of MLSC 25 to the routing control unit 50, and ultimately sent to a destination device on the network according to the multi-link protocol.

In some cases, quality of service (QOS) handling of incoming packets that are to be fragmented by MLSC can also be performed within MLSC 25. In those cases, packet builder 86 forwards the header information to QOS handler 87, which performs quality of service handling prior to forwarding the header information on to output logic unit 64. Quality of service handling can be used to give priority to particular packets, i.e., packets headed for a particular destination, packets coming from a particular source, or packets having particular characteristics. For example, packets associated with voice streaming can be given priority by the router. Providing quality of service handling can allow service providers, for example, to guarantee available bandwidth for a subset of traffic flows, even when the router is receiving a total volume of incoming packets that exceed the router's output capacity.

QOS handler 87 maintains multiple queues per bundle. The number of queues per bundle depends on the implementation. When an incoming packet is received by MLSC, the respective modules of sequencer unit 68, such as reorder module 84 and packet builder 86, identify the packet as a sequenced packet and forward the header information on to QOS handler 87. QOS handler then queues the header information according to whatever QOS discipline has been established. For example, header information associated with packets of a higher priority can be queued in a different queue than header information associated with packets of that same bundle having a lower priority. The header information associated with higher priority packets can then be forwarded to output logic unit 64 prior to the header information associated with the lower priority packets, in some cases, even if the header information associated with lower priority packets was received by the QOS handler 87 more recently. In this manner, the quality of service feature can be provided within MLSC 25.

A given packet's priority can be established, for example, as part of the MLSC header (104, FIG. 8B). For example, the MLSC header could include yet another field identifying priority of the data block. Alternatively, the flow field could be expanded to include additional bits. Routing control unit 50 (FIG. 3) could set these bits with the appropriate priority information as part of the MLSC header. If the flow field identified the data block as a fragment, the additional bits would be irrelevant. However, if the flow field identified the data block as a packet, the additional bits could identify the priority of that packet. Header information could then be queued in QOS handler 87 according to priority. QOS handler 87 may include multiple queues per bundle, defining varying levels of priority. For example, eight different queues per bundle may be desirable. Header information queued in the highest priority queues could be forwarded to output logic module 64 prior to header information in the other queues. Alternatively, a more complex algorithm could determine which packets are forwarded to output logic module 64, basing decisions on both the priority of the packet and the time when the header information was queued by QOS handler 87.

A number of implementations and embodiments of the invention have been described. For instance, a multi-link service card (MLSC) has been described for use in a router. The MLSC may allow the router to support multi-link protocols by facilitating the sequencing, assembly, and/or fragmentation of data blocks such as packets or fragments, or the division of a stream of data blocks for transmission according to the multi-link protocol. Nevertheless, it is understood that various modifications may be made without departing from the spirit and scope of the invention. For example, the invention may be implemented to provide multi-link capabilities to various other network devices, such as switches. Moreover, the invention may be used to handle data blocks in formats other than packets or fragments. Accordingly, other implementations and embodiments are within the scope of the following claims.

The invention claimed is:

1. A method comprising:
    receiving data packets from a plurality of links in one or more interface cards of a network device;
    performing, by the network device, a first routing operation to forward the data packets from the one or more interface cards to a service card of the network device in accordance with routing information that reflects a topology of a computer network, wherein the routing information identifies the service card as a destination for the data packets;
    prioritizing the data packets with the service card of the network device; and
    performing, by the network device, a second routing operation in accordance with the routing information to forward the prioritized data packets to the interface cards of the network device for communication over the computer network in an order based at least in part on the prioritization.

2. The method of claim 1, wherein prioritizing the data packets comprises performing Quality of Service (QoS) prioritization.

3. The method of claim 2, wherein the QoS prioritization is performed based on header information associated with the data packets.

4. The method of claim 1, further comprising:
    by the service card, queuing header information associated with the data packets in a plurality of priority queues, wherein each of the priority queues is associated with a different priority level.

5. The method of claim 4, further comprising:
    by the service card, forwarding header information queued in a highest priority queue of the plurality of priority queues to the interface cards prior to forwarding header in formation queued in a lower priority queue of the plurality of priority queues.

6. The method of claim 4, further comprising:
    determining, by the service card, an order in which to forward the queued header information based on a priority level of the respective priority queue of the queued header information and based on a time at which the header information was queued by the service card.

7. The method of claim 4, wherein the header information associated with the data packets includes a field identifying a priority level of the data packets.

8. The method of claim 1, wherein at least one of the plurality of links comprises a logical link bundle that includes a plurality of physical links, further comprising:
    by the service card, maintaining a plurality of queues for the bundle, wherein each of the plurality of priority queues is associated with a different priority level; and
    by the service card, queuing data packets received on the bundle in different priority queues of the plurality of priority queues for the bundle based on a priority level indicated by the data packets.

9. A network device comprising:
    one or more interface cards for receiving data packets from a plurality of links;
    a service card comprising a Quality of Service (QoS) handler module having a memory to maintain a plurality of priority queues; and
    a routing control unit comprising circuitry that performs a first routing operation to forward the data packets from the one or more interface cards to the service card in accordance with routing information that reflects a topology of a computer network, wherein the routing information identifies the service card as a destination for the data packets,
    wherein the QoS handler module of the service card prioritizes the data packets using the plurality of priority queues, and
    wherein the routing control unit performs a second routing operation in accordance with the routing information to forward the prioritized data packets to the interface cards of the network device for communication over the computer network in an order based at least in part on the prioritization.

10. The network device of claim 9,
    wherein each of the plurality of priority queues is associated with a different priority level, and
    wherein the QoS handler module prioritizes the data packets by queuing header information associated with the data packets in different ones of the plurality of priority queues.

11. The network device of claim 10, wherein the service card queues header information in the plurality of priority queues according to a priority level indicated in the header information.

12. The network device of claim 10, wherein the QoS handler module forwards header information queued in a highest priority queue of the plurality of priority queues to the routing control unit for forwarding to the interface cards prior to forwarding header in formation queued in a lower priority queue of the plurality of priority queues.

13. The network device of claim 10, wherein the service card determines an order in which the routing control unit forwards the queued header information based on a priority level of the respective priority queue of the queued header information and based on a time at which the header information was queued by the service card.

14. The network device of claim 9, wherein at least one of the plurality of links comprises a logical link bundle that includes a plurality of physical links, and wherein the service card maintains a plurality of queues for the bundle, wherein each of the plurality of priority queues is associated with a different priority level.

15. The network device of claim 9, wherein the network device comprises a router.

16. The network device of claim 9, wherein the service card comprises a removable service card.

\* \* \* \* \*